United States Patent [19]

Matt

[11] 4,295,831

[45] Oct. 20, 1981

[54] COMPUTER PROGRAMMING TRAINING DEVICE

[76] Inventor: Frederick C. Matt, 1566 Campus Dr., Maple Glen, Pa. 19002

[21] Appl. No.: 30,321

[22] Filed: Apr. 16, 1979

[51] Int. Cl.³ .............................................. G09B 19/00
[52] U.S. Cl. ................................................ 434/118
[58] Field of Search .................... 35/10, 13, 19 A, 30; 434/118

[56] References Cited

U.S. PATENT DOCUMENTS

| | | | |
|---|---|---|---|
| 3,269,031 | 8/1966 | Pratt | 35/13 |
| 3,305,944 | 2/1967 | Albus | 35/30 |
| 3,352,031 | 11/1967 | Lindquist | 35/30 |
| 3,357,113 | 12/1967 | Hagelbarger | 35/13 |

*Primary Examiner*—Vance Y. Hum
*Attorney, Agent, or Firm*—Darby & Darby

[57] ABSTRACT

A device for teaching computer operation and programming by simulating computer operation is disclosed in which all components are mounted on a planar base member. The program is written in addressable storage compartments on a single, detachable program storage member. This permits reprogramming by simply interchanging program storage members. Main, random access, storage is also provided by an appropriately compartmented, detachable storage member. During operation, data input and output are written on detachable members so that a record of these is available. Similarly, internal operational registers incorporate detachable members on which information is written during operation, so that a record is also available of all internal operations. The training device also includes at least one jump switch which the operator can set to any of a plurality of different states. During execution of the program, the state of jump switches may be tested and branching operations performed in the program, depending on the state of the switches. This, in effect, permits restructuring the program without reprogramming the device. In operation, the sequence of instructions on the program storage member is followed to execute the program; the operator does all computations; and input data, output data, internal register information and internal information storage are written on the various detachable members. After the program is completed, the operator has a record of all operations, inputs and outputs on the various detachable members and these may be used to review and test the accuracy of his operation of the training device.

10 Claims, 8 Drawing Figures

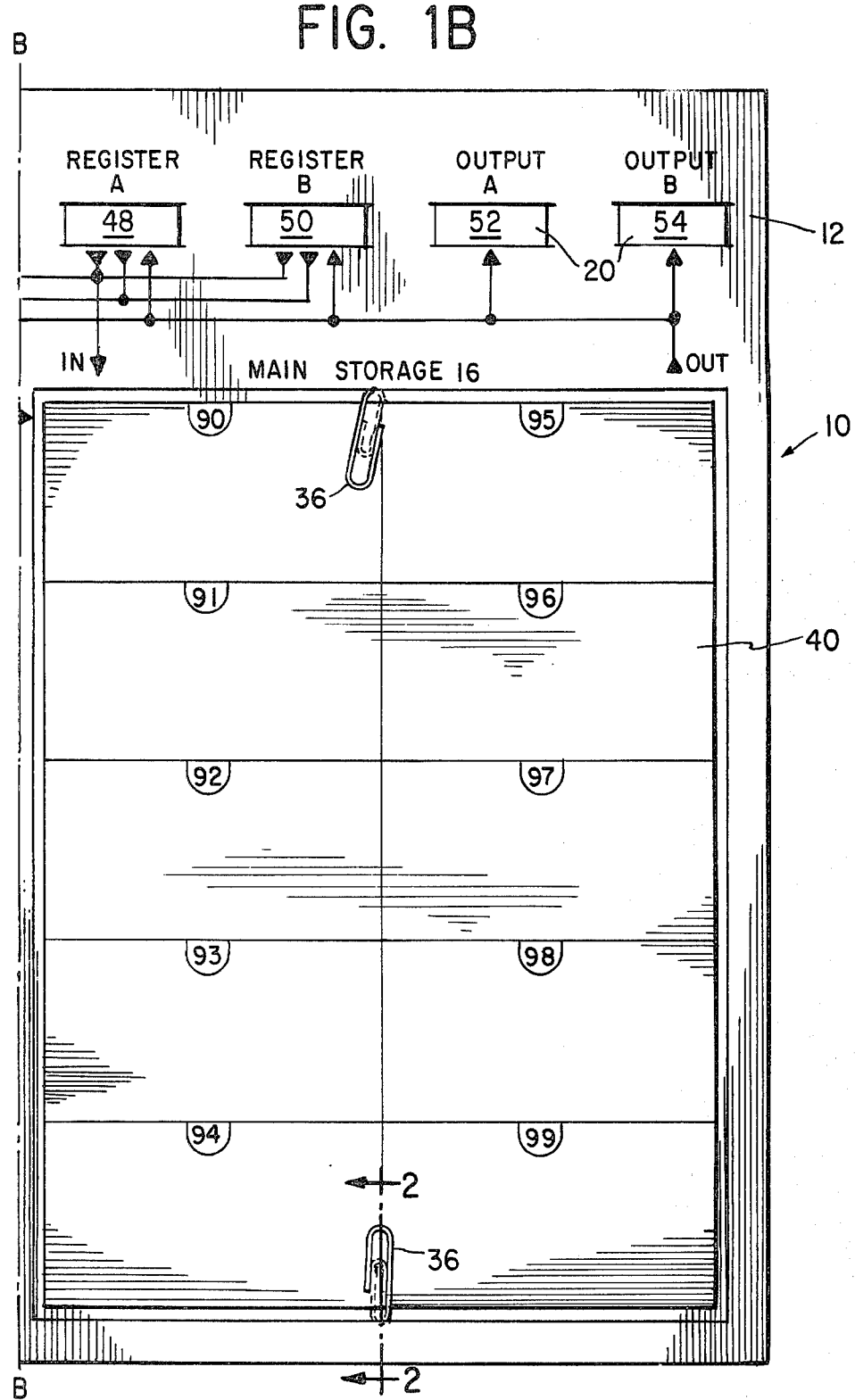

COMPUTER PROGRAMMING TRAINING DEVICE

This invention relates generally to teaching devices and, more particularly concerns a device for training students in computer fundamentals and programming.

In recent years, the widespread use of computers in all aspects of daily life has become common place. At this time, there is a growing market for personal computers and, with it, a growing general interest in fundamental computer operation and programming.

In the past, a number of devices have been available for training the uninitiated in computer operation and programming. These computer programming training devices have ranged in complexity from systems utilizing actual computers to simpler devices in which the operator simulates computer operations by performing computations and does the input and output functions by writing on appropriate storage elements. In general, such training devices have tended to teach computer fundamentals on a level which is too technical for a student interested in learning about computers from the point of view of the user who utilizers a computer as a computational aid. Furthermore, such training devices have been very inconvenient for use in a classroom environment.

One well-known prior art to training device typifies the difficulties encountered in using prior art devices in a classroom environment. This device includes: an input means simulating a deck of computer program cards on which the operator provides data and his program in the form of a numerical code; a mass storage member to which input information is transferred (by means of the operator writing it in) for storage and in which successive locations are read during execution of a program; and an output means to which data is transferred (by means of the operator writing it) as a result of computations in executing the program. The use of numerical codes to represent program instructions represents a substantial complication and referenced known device must provide a sophisticated decoding device which receives the numerical codes and tells the operator how to proceed. Furthermore, the reference training device adheres too closely to actual computer functioning to be a valuable pedagogical tool. For example, it is capable only of addition and subtraction and even a simple multiplication becomes a complex series of shifts and additions. A further disadvantage ruling out this device as a pedagogical aid, at least for classroom use, is that there is no convenient way for an instructor to test a student's ability or progress in learning to use this device, other than standing over the student and actually watching him operate it. In a classroom with a large number of students, the limited time available makes this impossible.

Broadly, it is an object of the present invention to provide a computer programming training device which overcomes one or more of the shortcomings of prior devices of this type. It is specifically contemplated that a training device be provided which is effective in teaching computer programming and fundamentals to students interested in using a computer primarily as a computational or problem solving aid.

It is another object of the present invention to provide a computer programming training device which does not require the decoding of complex numerical codes in order to execute a program.

It is yet another object of the present invention to provide a computer programming training device which is highly interactive with the operator and, therefore, particularly effective as a teaching device.

It is a further object of the present invention to provide a training device of the type described which offers flexibility in modifying stored programs so as to improve its value as a pedagogical and computational aid.

In accordance with another aspect of the present invention, a computer programming training device is made highly interactive by providing a separate input device through which the operator may enter data directly into the computer, even during execution of the program.

In accordance with yet another aspect of the present invention, flexibility in modifying computer programs is provided in a computer programming training device by including therein at least one jump switch which may be set prior to execution and restructures the program that is being executed.

In accordance with an illustrative embodiment demonstrating objects and features of the present invention, a computer programming training device is provided in which all components are mounted on a planar base member. The program to be executed is written on a single, detachable program storage member (in the form of suggestive mnemonic code words), so that the training device is conveniently reprogrammed by simply interchanging program storage members. Main, random access, storage is also provided by an appropriately compartmented, detachable storage member. In addition, data input and output are written on detachable members during operation, so that a record of these is available. Simiiarly, the internal opertional registers of the training device incorporate detachable members on which information is written during operation, so that a record is also available of all internal operations. The training device also includes at least one jump switch which the operator can set to any of a plurality of different states. During execution of the program, the state of jump switches may be tested and various branching operations performed in the program depending on the state of the switches. This, in effect, permits the operator to restructure the program without reprogramming the device. In operation, the sequence of instructions on the program storage members is followed to execute the program; the operator does all computations; and input data, output data, internal register information and internal information storage are written on the various detachable members. After the program is completed, the operator has a record of all operations, inputs and outputs on the various detachable members and these may be used to review and test the accuracy of his operation of the training device.

In an alternate embodiment, a simpler version of the training device is provided, which is useful in teaching young children. This alternate embodiment is provided with fewer features and more limited instruction codes, but incorporates most of the advantages of the present invention. This alternate embodiment has the distinct advantage of encouraging children to practice their arithmetic under the guise of teaching them simple computer programming.

The foregoing brief description, as well as further objects, features and advantages of the present invention will be more completely understood by reading the following detailed description of presently preferred, but nontheless illustrative, embodiments in accordance with the present invention, with reference being had to the accompanying drawings, in which:

FIGS. 1A and 1B, when arranged side-by-side so that lines A—A and B—B coincide, provide a plan view of a computer programming training device in acccordance with the present invention, the device including various counting indicators, a compare unit, and a plurality of jump switches;

Figure 6:
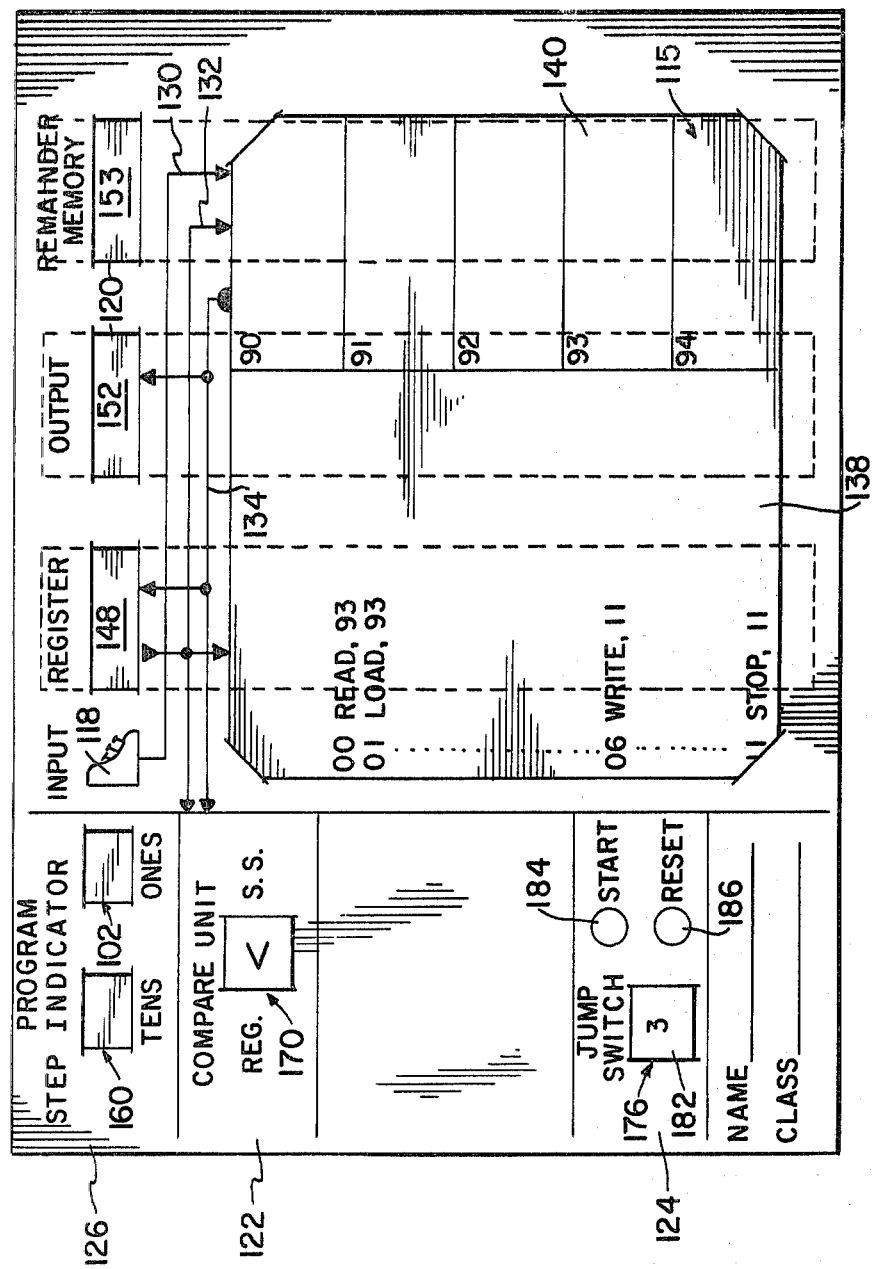

FIG . 5 is a plan view of a slide member useful in a jump switch;

FIG. 6 is a plan view of an alternate embodiment of the present invention; and

Figure 7:
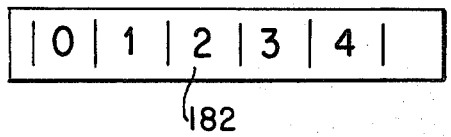
Figure 4:
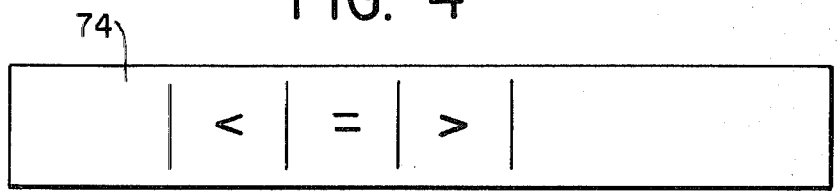
FIG. 4 is a plan view of a slide member useful in a indicator for the compare unit.

FIG. 7 is a plan view of a slide member useful in a jump switch of the alternate embodiment.

Figure 1A:
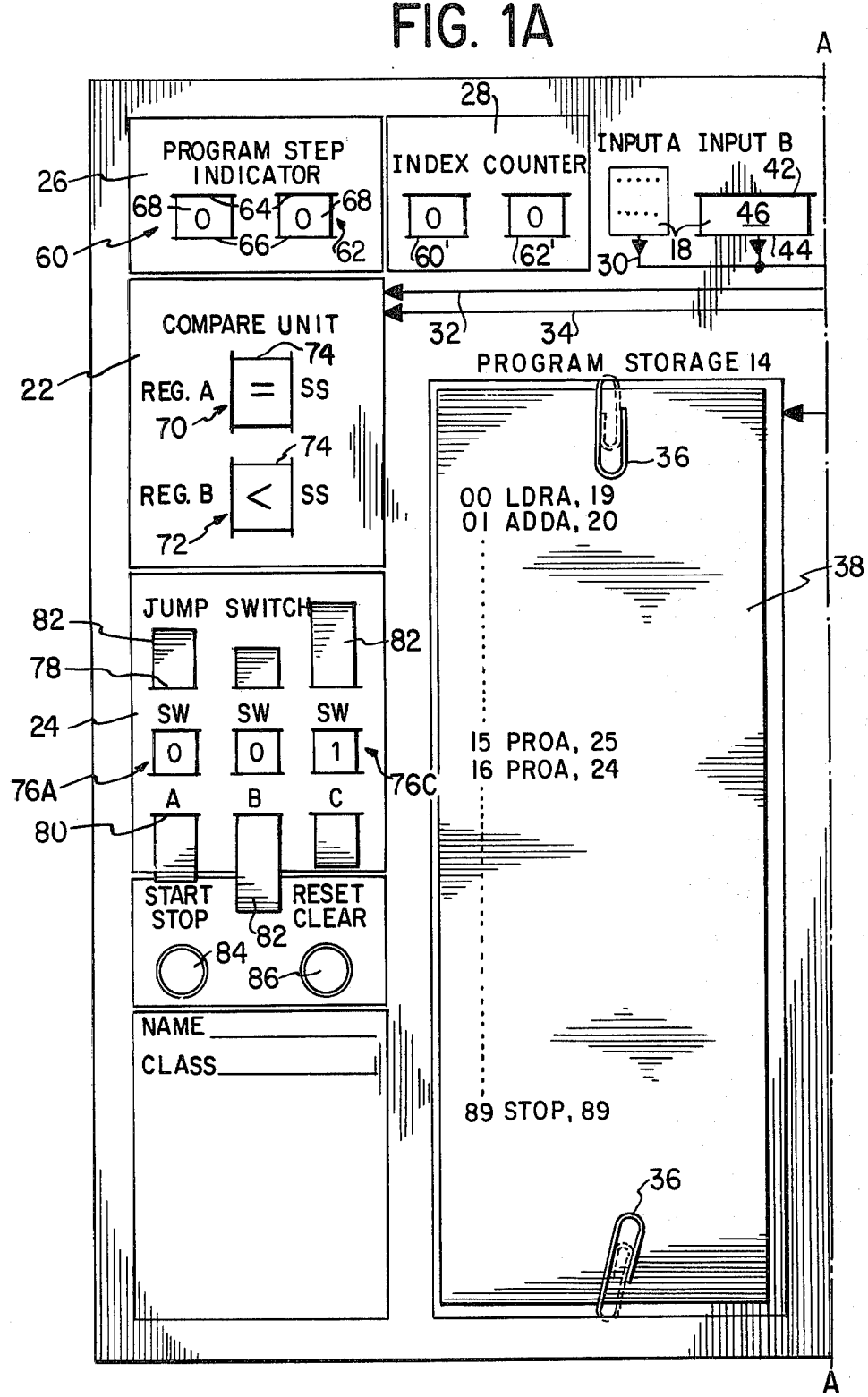
Figure 2:
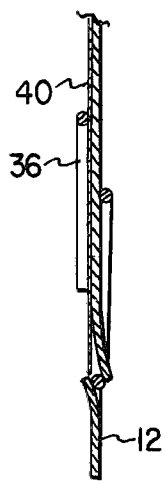
FIG. 2 is a fragmentary sectional view taken substantially along line 2—2 in FIG. 1B to show some constructional details on the training device.

Turning now to the details of the drawings, FIGS. 1A and 1B, when arranged side-by-side so that lines A—A and B—B coincide, provide a top plain view of a computer programming training device 10 embodying objects and features of the present invention, and FIGS. 2-5 illustrate further details of this embodiment. The training device, includes a base member or console 12, which serves as the support structure for all components of the training device 10. On base member 12, are provided: a program storage unit 14; a main stoarge unit 16; an input unit 18 comprising the input sources A and B; and output unit 20 comprising the output devices A and B; and arithmetic and logic unit comprising operational registers A (19) and B (21) and compare unit 22; and a control unit comprising jump switch assembly 24, program step indicator 26, and index counter 28. In addition, the flow of information within the training device 10 is shown by directed line segments (e.g. 30, 32 and 34), which represent data busses, by means of which information is transferred about for processing.

In operation, a student stores a multi-step program in program storage unit 14 and, as the operative force for the computer simulated by the device 10, executes the program step by step under control of jump switch assembly 24, program step indicator 26 and index counter 28. During execution of the program, the student can interact with the computer: he may be asked questions or instructed to provide data and, in response, can provide data input via input unit 18 and receiving data outputs via output unit 20. The student performs the arithmetic and logic operations of the computer with the aid of registers A and B and compare unit 22 and utilizes main storage unit 16 for all non-program storage requirements during execution.

In the preferred embodiment, the base member 12 is made of cardboard, but it can be made of any inexpensive, durable sheet material. Conveniently located areas are provided on base member 12 for storage units 14 and 16. Each storage unit inclides a pair of conventional paper clips 36, 36 extending above and below the surface of base member 12 so as to be capable of retaining replaceable storage members. The replaceable program storage member 38 is made of a sheet material (preferably paper) and has imprinted upon it, in numbered sequence (each number represents a program storage location), the steps of the computer program which is to be executed. In the preferred embodiment, the computer program may include 90 steps numbered from 00 to 89 and the actual instructions at each step are represented by mnemonics, which will be discussed in more detail below. The replaceable main storage member 40 includes a plurality of different storage areas. In the preferred embodiment, there are ten main storage areas numbered 90 through 99, respectively, and the student may read into or from any of them in a random access fashion. Reading into a storage area is achieved by simply writing the desired information in that area. It will be appreciated that it is possible to write over the information stored in each area by simply crossing it out and entering new information.

Input B, registers A and B and outputs A and B are identical register units. Thus, only input B will described in detail. Input B is formed in base member 12 by making a pair of substantially parallel slits 42, 44 and a strip of blank sheet material 46, for example paper, which is passed through the slits from the rear of base member 12 so that only a small portion of the strip 46 is visible between the slits 42, 44. Data for input B is written by the student directly onto the exposed portion of strip 46, which is slid between the slits 42, 44 to expose a clean surface each time a new input is to be entered. Thus, strip 46 includes a record of all data which has been entered thereinto. Similar strips 48, 50, 52 and 54 are provided in the other register devices mentioned above. Input A does not provide a record of data inputs, but is merely intended to represent an input device such as a keyboard. In effect, the student pretends that he is entering data input via a keyboard and merely writes the data into the appropriate location onto main storage member 40.

From the description thus far, some of the pedagogical benefits of device 10 can be appreciated. For example, each student in a class could be provided with a training device 10. For the purposes of testing the student's abilities, their instructor could provide them with a given prepared program storage member 38 for executing the program. At the conclusion of the examination, the instructor examine each student's main storage member 40 and/or one or more of strips 46-54 and to determine each student's abilities on the basis of the contents of this main storage member and/or strips 46-54. This same feature makes it particularly convenient to stop execution of a program midway, to perform another program and then to resume the initial program. All the student need do is remove the various strips from register devices and the two storage members and to make a note of the states of the various indicating devices. The program can then be resumed at any time by restoring the display devices to their respective states and replacing the removed strips and storage members.

Figure 3:
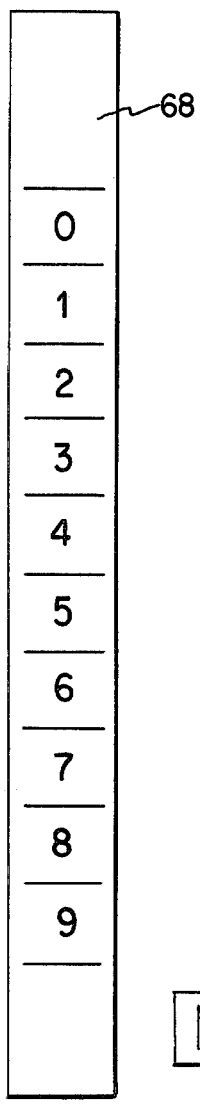
FIG. 3 is a plan view of a slide member useful in a counting indicator.
Figure 5:
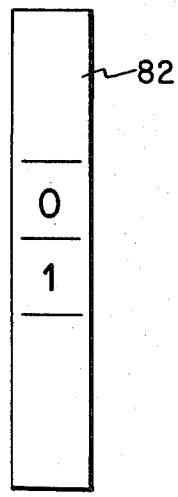

Program step indicator 26 provides a running, two digit decimal display of the program step being executed. It includes a ten digit indicator 60 and a units digit indicator 62, each of which are formed by providing a pair of spaced, parallel slits 64 and 66 in base member 12 and inserting a strip-like slide member 68 through the slits 64, 66 from the rear of base member 12. As can be seen in FIG. 3, each slide member 68 has the digits 0–9 imprinted thereon, so that the two slide members 68 may be adjusted to display any number between 0 and 9 in the window formed between the slits 64 and 66. In executing the program, the student merely adjusts program step indicator 26 to indicate the number of each program step prior to performing that step. As will be explained below, in more detail, the program itself may instruct that the program step indicator 26 be set to a particular number (for example, when a program jump occurs), in which event the corresponding step in the program is to be performed.

Index counter 28 includes a tens digit indicator 60' and a ones digit indicator 62', which are identical to digit indicators 60 and 62, respectively, of program step indicator 26. The operation and function of index counter 28 is, however, completely under control of the program and is totally different from that of program step indicator 26. A typical use for index counter 28 is keeping track of repetitive operations. When used for this purpose, index counter 28 is loaded with a number corresponding to the desired number of repetitions and is decremented by one each time a repetition is performed. The repeated part of the program is terminated once the indicated count of index counter 28 reaches 00. Further details of the operation of index counter 28 will be provided below.

Compared unit 22 permits comparison of the content of register A or register B to the contents of a specified location in main storage member 40. Compare unit 22 includes a pair of indicators 70 and 72, which are dedicated to registers A and B, respectively, and are operated by the student to display and store the result of the comparison of the corresponding register. Indicators 70 and 72 are similar in construction to the digit indicators 60, 62 in program step indicator 26. The major difference is that the slide members 74 move horizontally to avoid interference with the slide members 68 of program step indicator 26. In addition, slide member 74 includes only three indicia, which are not numbers, but the symbols for less than (<), equal (=), and greater than (>). In operation, the compare unit is utilized when a compare instruction is encountered in executing the program stored on program storage member 38. Assuming, for example, that the instruction was CPRA, 93, the contents of register A would be compared to the contents of storage location 93 on main storage member 40. Assuming further that the result of the comparison was that the contents of register A were less than the contents of storage area 93, indicator 70 would be adjusted to display the symbol "<"). It will be appreciated that the use of compare unit 22 as explained, makes the result of the comparison available for further operations, even if the contents of register A and/or storage area 93 are subsequently changed. This permits subsequent decisions, such as executing branching operations within the program, to be executed without repeating the comparison and without even retaining the data that was compared. Further details of the operation of compare unit 22 will be explained below.

Jump switch assembly 24 comprises three binary switches 76A, 76B, and 76C, referred to hereafter as switches A, B and C, respectively. These switches are similar in construction to digit indicator 60 of program step indicator 26, except that additional slits 78 and 80 are provided, respectively, above and below the slits forming the display window (for a total of four slits for each switch). This permits the ends of the slide member 82 to be brought through the base member 12, from its undersurface to its upper surface, thereby avoiding interference with slide 74 of compare unit 22 during operation. It should also be noted that, inasmuch as switches A, B and C are binary, the slide members 82 include only the digits 0 and 1. It will be appreciated that, if it were desired to make the switches A, B and C other than binary, additional digits could be provided on slide members 82. It will also be appreciated that the construction of switches A, B and C is merely illustrative, as is the construction of the corresponding display elements in compare unit 22, program step indicator 26, and index counter 28. For example, this particular type of display device could be replaced by a rotating disc which is viewed through a window formed in base member 12.

In using training device 10, jump switch assembly 24 is used to achieve restructuring of the program being executed. For example, a program may be written so that alternate sequences of operations are followed, beginning from various branch points, and so that the decision as to which sequence to follow depends upon the state of one or more of jump switches A, B or C. The student would then set the jump switches A, B and C in accordance with the actual program he wished to excute, prior to executing the program, and execution of the desired program would thereby be achieved. It will also be appreciated that instructions could be provided in a program to adjust the value of switches A, B or C, so that a program could be made to restructure itself, based upon the outcome of computations.

In addition to the structure already discussed, training device 10 includes a simulated start/stop button 84 and a simulated reset/clear button 86. These components have no operative effect, but are merely intended to give the impression that the training device is a machine, so that the student can pretend he is operating the same.

Referring now to FIG. 6, there is illustrated an alternate embodiment 110 of the training device 10 which is useful, for example for teaching computer programming to young children. Training device 110 is similar in construction to device 10, except it is substantially simpler. Components in training device 110 which correspond to components in device 10 have been designated with second and third digits which are the same as the reference character designation for the corresponding element in training device 10. The initial "1" is provided in the reference numbers for device 110 to indicate that the component is part of training device 110. The major distinctions to be noted are that training device 10 includes only a single, replaceable storage member 15 and further includes a remainder memory 117, which was not provided in training device 10. There are further distinctions which are merely the result of simplification, such as the provision of a single input device 118, which is similar to the keyboard (input A) of training device 10; the provision of a single operational register and a single output 120, with the result that compare unit 122 has only one indicator 170; and the provision of a jump switch assembly 124 with a single jump switch 176, having a slide member 182 with five possible display conditions represented by the digits 0, 1, 2, 3 and 4.

The single replaceable storage member 115 serves the function of both storage members 38 and 40 of training device 10. For this purpose, it includes a portion 138 on which the entire program to be executed is provided and a portion 140, representing ain storage, which is divided into five storage areas designated 90 through 94.

The remainder memory 117 is similar in construction and operation to input B of training device 10. Its main purpose is to provide a dedicated storage location providing a record of the remainders of division operations.

When teaching children division, the computation of remainders is often very important and a written record of all computed remainders would be of pedagogical value. For example, after providing the students with a storage member 115 representing an examination problem, the instructor may wish to collect the filled in members 115 and the strips 153 from remainder memory 117 for the purpose of grading.

Operation of a training device in accordance with the invention will now be described in more detail and specific examples illustrating the use of the various structural features will be provided. The specific examples will be described with respect to training device 10, for generality. However, it will be appreciated that similar programs could be provided for training device 110 if features not provided therein are not required.

In accordance with the present invention, the program to be executed is stored within the training device 10 in the form of sequential program instruction codes in which each step is represented by a mnemonic alphanumeric code suggestive of the function to be performed. The mnemonic instruction program codes of the preferred embodiment and the corresponding operations performed on the structure of the training device 10 are defined in table I. The examples given below illustrate the use of these codes and the corresponding manipulation of the training device 10. It should be kept in mind that, prior to the execution of a program, the apparatus must be reset or cleared. This includes performing the following steps:

(a) setting the program step indicator to 0,
(b) setting the index counter to 0,
(c) setting registers A and B to 0, and
(d) setting the compare units slides to the symbols =.

Referrring to Table I, it will be noted that each instruction code is an alphanumeric word having the following general form:

[(operation)*], 55 where OPERATION is an alphabetic portion indicating the operation to be performed, * is a designation of which component is being operated upon (it may be placed in the middle of the OPERATION portion), and 55 is a two digit number indicating the storage location which is involved. The OPERATION portions of the program codes have been designed to be suggestive of the corresponding operation so that no decoding is necessary. Thus, for example, ADD is an addition operation, CPR is a comparison, INDS is a substraction from index counter 28, and J*GT is a jump in program indicator 26 when compare unit 22 indicates "greater than". The * may be the letters "A" or "B" (to indicate the corresponding input, output, register or compare unit register, depending upon the particular OPERATION) or it may be the letter "I" (to indicate index counter 28). 55 indicates, depending upon OPERATION, either the main storage location which is the source or destination of data, or the program storage location which contains the next program step to be executed. In the case of jump switch instructions, the code includes the symbol # to represent the state of the switch.

In the case of an arithmetic operation, one of the numbers to be operated upon must be either on strip 48 or register A or strip 50 of register B. After the operation, the resulting number is written into the same register, unless the instruction in Table I indicates otherwise. This means that the original number in the register will no longer be visible in the register window and is effectively unavailable for further computations.

TABLE I

| Code | MNEMONIC PROGRAM INSTRUCTION CODES<br>Operation Performed |
|---|---|
| ADD*,SS | Add to Register * the number in storage location SS. |
| CPR*,SS | Compare Register * to the number in storage location SS. |
| DIV*,SS | Divide Register * by the number in storage location SS. Quotient in Register *; remainder in the other register. |
| DVD*,SS | Divide the decimal number in Register * by the decimal number in storage location SS. Quotient in same register. |
| ENI*,SS | Enter information from Input * into storage location SS. |
| EXP*,SS | Raise Register *, to the exponent, or power in storage location SS. |
| INDA,SS | Add to the Index Counter the number in storage location SS. |
| INDL,SS | Load the Index Counter with the number in storage location SS. |
| INDS,SS | Subtract from the Index Counter the number in storage location SS. |
| JIBD,SS | Jump to SS if there is data showing in the window of Input B. |
| JJ*#,SS | Jump to SS if Jump Switch * is set to the number #. |
| JUMP,SS | Jump to SS. Set the Program Step Indicator to the number SS. |
| J*EQ,SS | Jump to SS if Register * on the Compare Unit is equal. |
| J*GT,SS | Jump to SS if Register * on the Compare Unit is greater than. |
| J*LT,SS | Jump to SS if Register * on the Compare Unit is less than. |
| J*NE,SS | Jump to SS if Register * on the Compare Unit is not equal. |
| J*NG,SS | Jump to SS if Register * on the Compare Unit is not greater than |
| J*NL,SS | Jump to SS if Register * on the Compare Unit is not less than |
| J*NZ,SS | Jump to SS if Register * on the Index Counter is not zero. |
| J*ZE,SS | Jump to SS if Register * on the Index Counter is zero. |
| LDR*,SS | Load Register * with the contents of storage location SS. |
| MUL*,SS | Mutiply Register * by the number in storage location SS. |
| NOOP,SS | No operation, just add one to the Program Step Indicator. |
| PAB*,SS | Print Register A, space, Register B, /, SS on Output *. |
| PBA*,SS | Print Register B, space, Register A, /, SS on Output *. |
| PRO*,SS | Print on Output * the information in storage location SS. |
| REV*SS | Reverse the number in Register * |

TABLE I-continued
MNEMONIC PROGRAM INSTRUCTION CODES

| Code | Operation Performed |
|---|---|
| SJ*# | Set jump switch * to the number # |
| SQT*,SS | Replace the number in Register * by its square root. |
| STOP,SS | Set the Program Step Indicator to the number SS and stop. |
| STR*,SS | Store the contents of Register * into storage location SS. |
| SUB*,SS | Subtract from Register * the number in storage location SS. |
| SWAP | Interchange the contents of registers A and B |

Definitions:
SS-storage location number from 00 to 99 or IN if referring to index Ctr for SS.
*-the designation (alphabetic) of a register, jump switch or the index counter (if "I" is the designation)
-a number to which a jump switch is to be set

EXAMPLE 1

The first sample program illustrates the interactive nature of training device 10 by showing some basic operations. Assume that the following program #5 where printed on program storage member 38 (the general purpose of the program is explained in its text):

Program #5—This is a practice program showing how a person is able to enter information into the storage units of a computer. Program step 00 asks you to enter any number, N, from input B, and that number is placed into storage position 90. The computer will then calculate the first three non-zero multiples of the number N and print them on output B. If you enter a 5, for instance, output B will print the numbers 5, 10, 15.

| | | |
|---|---|---|
| 00 | PROA, 11 | |
| 01 | ENIB, 90 | |
| 02 | ADDA, 90 | |
| 03 | STRA, 91 | |
| 04 | PROB, 91 | |
| 05 | ADDB, 09 | |
| 06 | CPRB, 10 | |
| 07 | JBLT, 02 | |
| 08 | STOP, 08 | |
| 09 | 1 | |
| 10 | 3 | |
| 11 | ENTER N AT INPUT B | |

At program step 00, the student is instructed to print at output A, the contents of location 11 (i.e. the statement "ENTER N AT INPUT B" is written onto strip 52). Thus, training device 10 is communicating with the student to tell him to write a number on strip 46 of input B. At step 01, the number from input B is placed in storage location 90. This simply requires that the student write the number N appearing at input B into storage location 90. At step 02, the number in storage location 90 is added to register A and the result is retained in that register. Inasmuch as register A is initially cleared, it includes the number N upon the completion of this last step.

At step 03, the contents of register A (i.e. the number N) is stored in location 91. This requires that the student write the number appearing in register A into storage location 91. At step 04, the information stored in location 91 is printed at output B by writing the same on strip 54. At step 05, the contents of storage location 09 (i.e. the number 1) are added to register B, which being initially cleared, will now contain the number 1. At step 06, the content of register B are compared to the contents of location 10 (i.e. the number 3), since register B includes the number 1, indicator member 70 of computer unit 22 is adjusted to indicate the symbol "<". Step 07 is a branch in point, at which the program returns to step 2 if register B of computer unit 22 indicates the symbol "<" and proceeds to step 8 if that register indicates any other symbol. The program will have to repeat steps 02 through 07 two more times before the program reaches step 08 and stops. Each time steps 02 through 07 are repeated, the contents of storage area 90 are added to register A and the result is printed out. The second time steps 02 through 07 are executed, the number equal to 2×N is printed, and the next time the number equal to 3×N is printed. The third time the program repeats step 06, compare register B is set to display an equal sign, so that no jump occurs from step 07 to step 02. The program, instead, proceeds to step 8 and stops.

EXAMPLE 2

For the purpose of illustrating a typical use of index counter 28, program #5 could be rewritten as follows:

| | | |
|---|---|---|
| 00 | INDL, 10 | |
| 01 | PROA, 11 | |
| 02 | ENIB, 90 | |
| 03 | ADDA, 90 | |
| 04 | STRA, 91 | |
| 05 | PROB, 91 | |
| 06 | INDS, 09 | |
| 07 | JINZ, 03 | |
| 08 | STOP, 08 | |
| 09 | 1 | |
| 10 | 3 | |
| 11 | ENTER N AT INPUT B | |

It should be noted that steps 01 through 05 and steps 08 through 11 in the new program are identical to steps 00 through 04 and steps 08 through 11, respectively, of program #5. The main difference between the two programs is that, in the new program, index counter 28 controls the repeated computations and printouts. Specifically, the index counter is loaded at step 00 with the contents of location 10 (i.e. the number 3) by adjusting index counter 28 to display "03". The program then progresses as previously, with the sequence of steps 03 through 07 being repeated. Each time step 06 is reached, the contents of the index counter are reduced by the number appearing at location 09 (i.e. the index count is decremented by one). Step 07 is a branch point, but now the student checks the index counter to see if its count is a zero. As long as the count is not zero, program step indicator 26 is reset to 03 and the sequence of steps beginning at step 03 is repeated. When the count is zero, the program proceeds to step 08 and stops.

In comparing the two programs, it will be appreciated that both of them include the same number of steps. However, the new program is substantially more efficient and is executed more quickly as a result of utilizing index counter 28. In particular, it should be noted that the time consuming compare step (i.e. step 06 of program No. 5) has been eliminated. The elimination of this step has made the program particularly efficient because that step had to be performed each time the step sequence was repeated. This comparison of the two programs will teach the student the significance of computation efficiency and its effect on speed of execution.

EXAMPLE 3

In this example, the use of jump switch assembly 24 to reconfigure a program is illustrated. The basic program is the same as that in Example 2. In fact, the student has the opportunity to execute exactly the same program by setting jump switch A to 0. However, if he sets the jump switch A to "1", he has the opportunity to print additional outputs and may control the number of outputs printed.

The program of Examples 3 is as follows:

| | |
|---|---|
| 00 | JJA1, 13 |
| 01 | INDL, 10 |
| 02 | PROA, 12 |
| 03 | ENIB, 90 |
| 04 | ADDA, 90 |
| 05 | STRA, 91 |
| 06 | PROB, 91 |
| 07 | INDS, 10 |
| 08 | JINZ, 04 |
| 09 | STOP, 09 |
| 10 | 1 |
| 11 | 3 |
| 12 | ENTER N AT INPUT B |
| 13 | PROA, 17 |
| 14 | ENIB, 92 |
| 15 | INDL, 92 |
| 16 | JUMP, 02 |
| 17 | ENTER NO. OUTPUTS AT INPUT B |

It will be noted that steps 01 through 12 of this program are the same as steps 00 through 11 of the program of Example 2. Step 00 of the present program performs a test of jump switch 1 and if that switch is set to zero program execution begins with step 01. If jump switch A is set to 1, on the other hand, program step indicator 26 is set to 13, causing program execution to begin with that step. At step 13, training device 10 causes the contents of location 17 to be printed at output A so that the student is instructed to enter at input B the number of outputs he desires to print. At step 14, the number the student has entered in input B is read into storage location 92 and at step 15 that number is loaded into index counter 28 (i.e. index counter 28 is set to display the number stored in location 92). At step 16 a jump to step 02 occurs. This requires setting the program step indicator to 02 and proceeding with program execution from there. In effect, the desired number of outputs which the students has indicated he wants has been loaded into index counter 28 in place of the loading that would have originally occurred at step 01, but the program will now proceed as it did in Example 2. The one difference in the program execution will be that steps 02 through 08 will be repeated the number of times which the student indicated instead of 3 times. By operating jump switch A, the student can effectively restructure the program to be more interactive and to print a different number of outputs that were provided for in the initial program of Example 2.

Although presently preferred embodiments of the invention have been disclosed for illustrative purposes, it will be appreciated by those skilled in the art that many additions, modifications and substitutions can be made without departing from the scope and spirit of the invention as defined in the accompanying claims.

What is claimed is:

1. A computer programming training device for teaching an operator the fundamentals of computer programming and operation, said device being operated by the operator to duplicate the physical functions performed by a programmable computer, said device comprising:

a base member serving as a console for said device;

a substantially planar program storage member mounted on said base member to be detachable as a unit, said program storage member having a plurality of storage compartments each bearing a unique address identification, each compartment having written therein a word comprising a step in a program to be executed by the operator in simulating the operation of a programmed computer, said program storage member being adapted to contain the entire program to be executed;

means on said base member for detachably receiving said program storage member;

a program step indicator on said main member, said program step indicator including means adjustable by the operator to display a number corresponding to the address of the storage compartment which contains a particular program step concurrently with the execution of said program step;

a substantially planar main storage member mounted on said base member, said main storage member having a plurality of storage compartments each bearing a unique address which is different from any address borne by a compartment of said program storage member, the operator providing intercommunication between said program storage member and said main storage member so that, upon instruction by one of the program steps in a compartment of said program storage member, data from a compartment of one thereof may be transferred and written into a compartment of the other;

means on said base member for receiving said main storage member;

input means on said base member for receiving data from the operator, said data being written by the operator directly into one of the compartments of said main storage member upon instruction by one of the program steps stored in a compartment of said program storage member;

output means for receiving data directly from a compartment of said main storage member, said output means including means for receiving data, said data being copied by the operator from said main storage means upon instruction from a program step stored on said program storage member; and operational register means on said base member for storing data, the operator providing intercommunications between said register means and said main storage member so that, upon instructions by a program step stored on said program stored means, data from said register means is written into a prescribed compartment of said main storage member and data from prescribed compartment of said main storage member may be provided to said register means.

2. A training device in accordance with claim 1 wherein at least one of said input means, said output means and said register means comprises a substantially planar member detachably mounted on said base member wherein the content of the corresponding apparatus is written by the operator.

3. A training device in accordance with any preceding claim wherein said main storage member is a substantially planar member mounted on said base member to be detachable as a unit.

4. A training device in accordance with claim 3 wherein said input means, said output means, said register means, and each storage compartment of said storage member have sufficient space for a plurality of entries, the operator making a new entry in each without destroying previous entries.

5. A training device in accordance with claim 1 or claim 2 wherein said program storage member and said main storage member are incorporated on a common member detachably mounted on said base member.

6. A training device in accordance with claim 1 further comprising jump switch means having at least one indicator adjustable by the operator to indicate a plurality of different values, said program storage member having at least one instruction step thereon which instructs the operator to adjust the display of said program step indicator, depending upon the value displayed by said at least one jump switch indicator means.

7. A training device in accordance with claim 1 further comprising compare means including at least one indicator adjusted by the operator upon instruction by a program step on said program storage member to indicate whether data on said register means is less than, greater than or equal to data in a specified compartment of said main storage member.

8. A training device in accordance with claim 1 further comprising index counting means adjusted by the operator to display a specified number on instruction from a compartment of said program storage member, said program storage member including at least one compartment having an instruction which orders the operator to adjust the value of said program step indicator depending upon the value of said index counter means.

9. A training device in accordance with claims 1, 2, 6, 7 or 8 wherein at least one compartment of said program storage member contains an alphanumeric instruction code word having an instruction portion and an address portion, said instruction portion being a mnemonic which is suggestive of the instruction to be performed.

10. A training device in accordance with claim 9 wherein said at least one compartment contains at least one instruction code word in the form of one of the instruction codes listed in Table I, the operator performing the corresponding operation upon encountering said word.

* * * * *